(No Model.) 2 Sheets—Sheet 2.

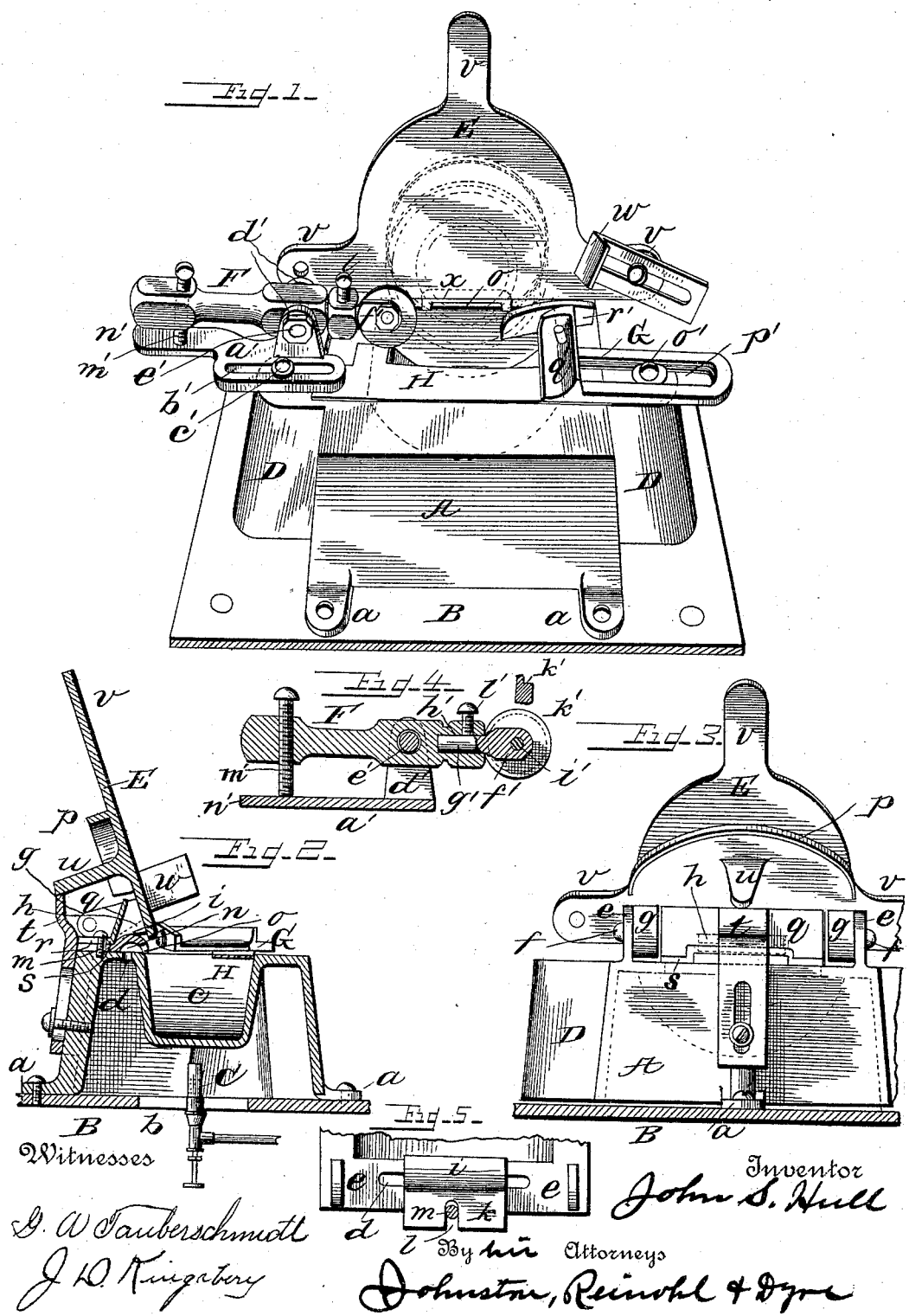
(No Model.) 2 Sheets—Sheet 1.
J. S. HULL.
CAN SOLDERING MACHINE.
No. 448,345. Patented Mar. 17, 1891.

J. S. HULL.
CAN SOLDERING MACHINE.

No. 448,345. Patented Mar. 17, 1891.

WITNESSES:
G. W. Tauberschmidt
J. D. Kingsbury

INVENTOR,
John S. Hull
BY
Johnston, Reinohl + Dyne
ATTORNEYS

UNITED STATES PATENT OFFICE.

JOHN S. HULL, OF BALTIMORE, MARYLAND.

CAN-SOLDERING MACHINE.

SPECIFICATION forming part of Letters Patent No. 448,345, dated March 17, 1891.

Application filed December 12, 1890. Serial No. 374,468. (No model.)

*To all whom it may concern:*

Be it known that I, JOHN S. HULL, a citizen of the United States, residing at Baltimore, in the State of Maryland, have invented certain new and useful Improvements in Can-Soldering Machines; and I do hereby declare the following to be a full, clear, and exact description of the invention, such as will enable others skilled in the art to which it appertains to make and use the same.

My present invention relates to can-soldering machines, and has especial reference to that class of machines in which the can to be soldered is revolved by hand, and is adapted for use in localities where power for driving machinery is not available.

The invention has for its object certain improvements in construction which will hereinafter be described, and more particularly pointed out in the claims.

Figure 6:
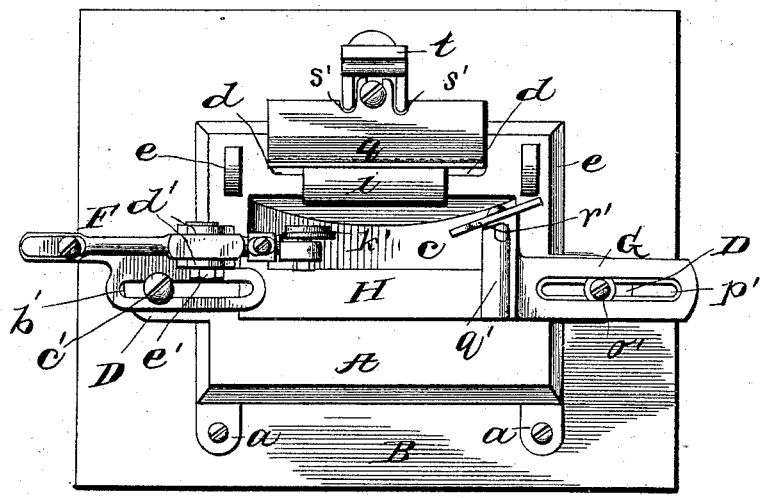
Figure 7:
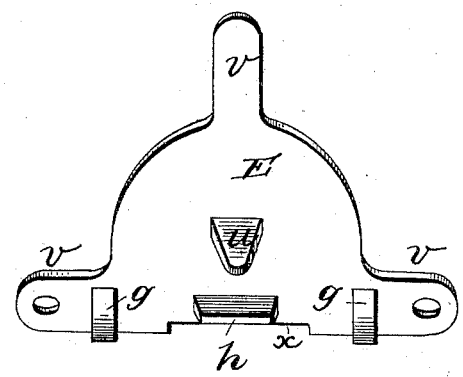

In the accompanying drawings, which form part of this specification, Figure 1 is a front perspective; Fig. 2, a vertical transverse section; Fig. 3, a rear elevation; Fig. 4, a vertical longitudinal section of the movable soldering-iron detached, and showing, also, a detached section of the face of the solder-wheel; Fig. 5, a plan showing the flame-slot and deflecting-hood; Fig. 6, a top plan view of the machine with the can-supporting plate removed; and Fig. 7, a rear elevation of the can-supporting plate detached.

Reference being had to the drawings and the letters thereon, A indicates the base of the machine, which is provided with lugs $a$ for securing it to a plate B, which may be secured to any suitable support. The plate B is provided with a central opening $b$, below which is a burner C, and above which is the solder bath $c$. On one or both sides of the base are projections D, which form supports for soldering irons or gages. In the upper surface and in the rear of the solder bath $c$ is a flame-passage $d$, and on each side thereof are lugs $e\ e$, to which a can-supporting plate E, inclined rearward over and above the flame-passage and pivotally secured by screw-bolts $f\ f$, which pass through the lugs $e\ e$ and engage with the lugs $g\ g$ on the rear side of the plate E, and admit of the plate being adjusted to angles adapted to the size of cans to be soldered. On the rear side of the plate E is a deflector $h$, for directing a portion of the flame from the slot or passage $d$ through the passage $x$, (shown in dotted lines in Fig. 1 and in full lines in Fig. 7,) forward over the surface of the solder in the bath, against that portion of the can being soldered that is entering and emerging from the solder, to heat said part and cut the surplus solder from the seam. I however prefer to use a deflecting-hood $i$ for this purpose, and construct it with flange $k$, having a slot $l$ for engagement with a screw $m$, and a chamber $n$, having a concave upper surface which directs the flame downward through the passage $o$ upon and into the solder, and keeps any dross from accumulating at the point where the can is in contact with the solder. The hood $i$ covers the central portion of the flame-passage $d$, which causes the flame to issue from said passage in two vertical sheets or streams, one at each end of the passage, as shown in Figs. 5 and 6, and impinge against the rear side of the can-supporting plate. The rear side of the plate E is also provided with a flange or projection $p$ for confining the flame in its travel up the rear side of the plate to a point where the heat will be applied to the lower part of the plate against which the can being soldered is resting, the flame being directed upward and prevented from passing out at the rear of the plate over the edge of the base by a hood or deflector $q$, which is also adjustably secured in position by the screw-bolt $m$, which passes through the slot $r$ in the flange $s$. In this flange are grooves $s'\ s'$, to admit of the vertical adjustment of the bracket $t$, against which the lug $u$ on the plate E rests as a support for the plate in any position or angle of inclination the plate may stand.

The deflector $q$ is adjustable upon the bolt $m$ to follow the angle of the plate E, and in whatever position the plate E may stand the deflector is so adjusted as to leave a narrow space between the plate and the upper edge of the deflector for the upward passage of the flame.

The plate E is provided with extensions $v$, to accommodate large cans, and at any convenient point on said plate or on the base is attached a metallic stroker $w$ for stroking off any excess of solder that may be on the can when it emerges from the bath and returning it to the bath. Heretofore it has been proposed to wipe off solder by means of an asbestos wiper, but in practice the asbestos becomes fouled with solder adhering to it and must be changed frequently. The metallic stroker effectually removes the solder by the operator passing the can over the stroker as he is removing the can from the machine.

Upon the upper surface of one of the projections D is adjustably secured a soldering-iron F, which is provided with a base $a'$, in which is a slot $b'$ for adjusting the soldering-iron longitudinally and laterally upon the projection toward or from the center of the plate E, to suit the size of cans being soldered. The base is held and guided by a screw-bolt $c'$, and from its upper surface project lugs $d'$ $d'$, between which the body portion of the soldering-iron is secured to oscillate freely vertically and vibrate slightly laterally upon a pin $e'$, which passes loosely through said body portion and closely through the lugs. In the front end of the body portion is a head $f'$, having a shank $g'$, which enters a socket $h'$ and rotates therein, and through the head $f'$ passes a bolt $i'$, upon which is supported a revoluble wheel $k'$, having a rabbet in its periphery which corresponds with the flange on the head or bottom of a can. The shank $g'$ is secured in the socket $h'$ by a set-screw $l'$, and the degree of tilt or vertical movement of the soldering-iron is regulated by a screw $m'$, passing through the rear end of the body portion and bearing upon the extension $n'$ of the base $a'$.

The proper angle of the plate E having been obtained, a can is placed in position upon the plate and the soldering-iron set so that the can will press the wheel $k'$ into the solder, and the angle of inclination given to the wheel by turning the shank $g'$ in the socket $h'$, so that the periphery of the wheel will coincide with the flange of the top or bottom of a can about to be soldered. The shank $g'$ is then secured by the set-screw $l'$. When a can has been soldered and removed from the bath and the plate E, the wheel $k'$ is raised out of the solder by the preponderating weight of that portion of the body of the soldering-iron beyond the transverse pin $e'$. Upon the opposite projection D is adjustably secured a gage G by a screw $o'$ passing through a slot $p'$, and to the inner side of the head $q'$ of the gage is secured a soldering-iron $r'$, set at an angle to bring the inner face of the iron adjacent to the flange on the top or bottom of the can.

Across the top of the solder-bath I have shown a plate H, which forms a support for the can as it is being revolved in the bath of solder by the hand of the operator, and prevents the solder being displaced over the wall of the well by the revolving can. It is evident that this plate will also serve to hold the solder in contact with the can, and that a can may be soldered without the use of the irons $k'$ or $r'$, and that the plate may be removed when using the irons $k'$ and $r'$ without great detriment to the machine.

Having thus fully described my invention, what I claim is—

1. In a can-soldering machine, a base provided with a solder bath, a flame-passage on one side of said bath, and a can-supporting plate inclined rearward over the passage and secured on both sides thereof in position for the flame to be projected against the rear side of the plate.

2. In a can-soldering machine, a base provided with a solder bath, a vertical flame-passage on one side of the bath, a can-supporting plate inclined rearward over said passage and secured above the passage on both sides thereof, and a hood projecting up from the base and forming a chamber between the plate and the hood for confining and directing the flame against the rear side of said plate.

3. In a can-soldering machine, a base provided with a solder bath, a flame-passage on one side of said bath, a can-supporting plate inclined rearward and pivotally and adjustably secured to the base over and above said passage and both sides thereof, and a hood projecting up from the base and inclined toward the plate to form a chamber between the plate and hood for confining and directing the flame against the rear side of said plate.

4. In a can-soldering machine, a base provided with a solder bath, a flame-passage on one side of said bath, a rearwardly-inclined can-supporting plate pivotally secured to the base over and above said passage and on both sides thereof in line of the flame from said passage, and a deflector for directing the flame in front of the plate.

5. In a can-soldering machine, a base provided with a solder bath, a flame-passage on one side of said bath, a can-supporting plate rearwardly inclined and pivotally secured to the base above said passage and on both sides thereof, and a deflector having a downward-curved surface for directing the flame in front of the plate into and across the bath.

6. In a can-soldering machine, a base provided with a solder bath, a flame-passage on one side of the bath, and a can-supporting plate having a flange or projection on the rear side to confine the flame to the lower portion thereof.

7. In a can-soldering machine, a solder bath, a flame-passage on one side of the bath, a rearwardly-inclined and adjustable can-supporting plate pivotally secured to the base over and above the passage and on both sides thereof, a curved flange on the rear side of said plate, and a vertically-adjustable bracket against which the plate rests for supporting said plate at any desired angle of inclination.

8. In a can-soldering machine, a base provided with a solder bath, a flame-passage on one side of the bath, lugs at both ends of the passage, and a can-supporting plate secured to said lugs over and above the passage in position for the flame to be projected against the rear side of the plate, in combination with an inclined flame-confining hood on the rear side of the plate.

9. In a can-soldering machine, a can-supporting plate having a solder bath and a projection on one side thereof, in combination with a revoluble soldering-iron adjustably secured to said projection.

10. In a can-soldering machine, a solder bath and a can-supporting plate, in combination with a vertically-adjustable soldering-iron having a revoluble wheel at one end.

11. In a can-soldering machine, a solder bath and a can-supporting plate, in combination with a soldering-iron supported upon an adjustable base and provided with an adjustable head supporting a revoluble wheel.

12. In a can-soldering machine, a solder bath and a can-supporting plate, in combination with a base and a longitudinally and laterally adjustable soldering-iron pivotally attached to said base.

13. In a can-soldering machine, a solder bath and a can-supporting plate, in combination with an adjustable base and a longitudinally, laterally, and vertically adjustable soldering-iron pivotally attached to said base.

14. In a can-soldering machine, a solder bath, a support crossing the bath, and a can-supporting plate, in combination with a soldering-iron supported upon an adjustable base on one side of the bath and pivotally secured therein.

In testimony whereof I affix my signature in presence of two witnesses.

JOHN S. HULL.

Witnesses:
D. C. REINOHL,
GEORGE W. FISHER.